United States Patent [19]
Lund et al.

[11] Patent Number: 5,988,728
[45] Date of Patent: *Nov. 23, 1999

[54] TONNEAU COVER; METHODS OF INSTALLATION AND USE OF TONNEAU COVER; AND TRUCK INCLUDING A TONNEAU COVER

[75] Inventors: David Lund, Andover; Larry J. Thomsen, Maple Lake; Michael J. Sterling; Joel Johnson, both of Coon Rapids, all of Minn.

[73] Assignee: Lund Industries, Incorporated, Anoka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/852,392

[22] Filed: May 7, 1997

Related U.S. Application Data

[60] Provisional application No. 60/017,640, May 7, 1996.

[51] Int. Cl.⁶ ............................................. B60P 7/02
[52] U.S. Cl. .................. 296/100.03; 296/100.08
[58] Field of Search ................ 296/101, 100.02, 296/100.03, 100.08, 100.06, 100.05, 100.1, 183, 184, 39.2, 100.04

[56] References Cited

U.S. PATENT DOCUMENTS

| | | | |
|---|---|---|---|
| D. 281,487 | 11/1985 | Chapman | D12/156 |
| D. 323,479 | 1/1992 | Akashi et al. | D12/156 |
| D. 324,195 | 2/1992 | Ueno | D12/156 |
| D. 333,607 | 3/1993 | Isler | D8/382 |
| D. 337,554 | 7/1993 | Lucas | D12/156 |
| D. 350,107 | 8/1994 | Ramaciotti | D12/401 |
| 3,936,077 | 2/1976 | Bliek | 280/423 R |
| 3,954,296 | 5/1976 | Patnode | 296/10 |
| 4,061,394 | 12/1977 | Vodin | 296/100 |
| 4,083,596 | 4/1978 | Robertson | 296/100.1 |
| 4,273,377 | 6/1981 | Alexander | 296/100 |
| 4,285,539 | 8/1981 | Cole | 296/105 |
| 4,377,307 | 3/1983 | Santarelli | 296/136 |
| 4,479,677 | 10/1984 | Gulette et al. | 296/98 |
| 4,573,730 | 3/1986 | Gondert et al. | 296/1 S |
| 4,600,233 | 7/1986 | Byodston | 296/24 R |
| 4,687,247 | 8/1987 | Muscat | 296/136 |
| 4,730,866 | 3/1988 | Nett | 296/100 |
| 4,792,178 | 12/1988 | Kokx | 296/98 |
| 4,799,729 | 1/1989 | Muscat | 296/136 |
| 4,838,602 | 6/1989 | Nett | 296/100 |
| 4,861,092 | 8/1989 | Bogard | 296/100 |
| 4,889,381 | 12/1989 | Tamblyn et al. | 296/98 |
| 5,067,766 | 11/1991 | Lovaas | 296/100.04 |
| 5,067,768 | 11/1991 | Fischbach | 296/107 |
| 5,098,148 | 3/1992 | Hoban | 296/66 |
| 5,139,375 | 8/1992 | Franchuk | 410/105 |
| 5,152,574 | 10/1992 | Tucker | 296/100 |
| 5,183,309 | 2/1993 | Jordan | 296/100 |

(List continued on next page.)

OTHER PUBLICATIONS

Custom Form Mfg., Inc., "Here It Is! Custom Cover™, the Utilmate Tonneau Cover", brochure from Custome Form Mfg., Inc., 2100 Industrial Pkwy, Elkhart, IN 45616 *undated).

"Saber Tonno" brochure from Extang Corporation, Ann Arbor, MI (undated).

*Primary Examiner*—D. Glenn Dayoan
*Assistant Examiner*—Jason Morrow
*Attorney, Agent, or Firm*—Merchant & Gould P.C.

[57] ABSTRACT

An tonneau cover for a pickup truck having a tapered bed construction is provided by the present invention. The tonneau cover includes a driver side rail for mounting to a driver sidewall of a pickup truck bed; a passenger side rail for mounting to passenger sidewall of pickup truck bed; and a rigid panel for slideably mounted along the driver side rail and the passenger side rail, and having a tapered construction which allows the rigid panel to fit between and adjacent a driver sidewall and a passenger sidewall of a pickup truck bed having a tapered bed construction.

24 Claims, 9 Drawing Sheets

U.S. PATENT DOCUMENTS

| | | | |
|---|---|---|---|
| 5,207,262 | 5/1993 | Rushford | 160/354 |
| 5,228,736 | 7/1993 | Dutton | 296/39.2 |
| 5,261,719 | 11/1993 | Tucker | 296/100 |
| 5,275,458 | 1/1994 | Barben et al. | 296/100 |
| 5,301,995 | 4/1994 | Isler | 296/100 |
| 5,328,310 | 7/1994 | Lockney | 410/97 |
| 5,335,960 | 8/1994 | Benignu, Jr. | 296/165 |
| 5,385,377 | 1/1995 | Girard | 296/36 |
| 5,398,985 | 3/1995 | Robinson | 296/10 |
| 5,472,256 | 12/1995 | Tucker | 296/100 |
| 5,632,522 | 5/1997 | Gaitan et al. | 296/100.1 X |

TONNEAU COVER; METHODS OF INSTALLATION AND USE OF TONNEAU COVER; AND TRUCK INCLUDING A TONNEAU COVER

This application claims priority to U.S. Provisional Patent Application Ser. No. 60/017,640, which was filed with the United States Patent and Trademark Office on May 7, 1996. The entire disclosure of the provisional patent application is incorporated herein by reference.

FIELD OF THE INVENTION

The present invention relates to tonneau covers and methods for operating and installing tonneau covers. More particularly, the present invention relates to a tonneau cover which is tapered to fit within a pickup truck bed having a tapered bed construction, which slides rearwardly in order to open the forward portion of the pickup truck bed, and which has an end which can move upwardly to further open and expose the pickup truck bed.

BACKGROUND OF THE INVENTION

Tonneau covers mounted on pickup trucks beds are common. Tonneau covers are generally used to help contain and/or conceal goods in the truck bed and to protect the goods from weather. Various designs of tonneau covers are available. For example U.S. Pat. No. Re.33,790 to Huber and U.S. Pat. No. 3,829,151 to Fellenestein describe tonneau covers as having hard and rigid covers over the pickup truck beds. Such covers can be heavy and difficult to manipulate.

U.S. Pat. Nos. 4,783,112 and 5,067,766 to Lovaas describe telescoping tonneau covers. These tonneau covers include a forward panel and a rearward panel, where the rearward panel is telescopically received under the forward panel. These tonneau covers do not move upwardly to expose the pickup truck bed.

SUMMARY OF THE INVENTION

A tonneau cover for a pickup truck having a tapered bed construction is provided by the present invention. The tonneau cover includes a driver side rail for mounting to a driver sidewall of a pickup truck bed; a passenger side rail for mounting to passenger sidewall of pickup truck bed; and a rigid panel for slideably mounting along the driver side rail and the passenger side rail, and having a tapered construction which allows the rigid panel to fit between and adjacent a driver sidewall and a passenger sidewall of a pickup truck bed having a tapered bed construction.

The tonneau cover according to the present invention may include a rigid panel slideably mounted along a driver side rail and a passenger side rail of a pickup truck having a tapered bed construction. The rigid panel includes a top surface which can be provided flush with the top surface of a pickup truck side rail.

A pickup truck is additionally provided by the present invention. The pickup truck includes a cargo area surrounded by a driver sidewall, a passenger sidewall, a tailgate, and a front wall, wherein the cargo area is provided with a tapered bed construction. A driver side rail is mounted on the driver sidewall, and a passenger side rail is mounted on the passenger sidewall. In addition, a rigid panel can be slideably mounted along the driver side rail and the passenger side rail. Preferably, and the rigid panel has a tapered construction for allowing the rigid panel to fit between the driver sidewall and the passenger sidewall of the pickup truck bed.

A method of installing a tonneau cover on a pickup truck having a tapered bed construction is provided by the present invention. The method includes steps of mounting a driver side rail on a driver sidewall of the pickup truck bed; mounting a passenger side rail on a passenger sidewall of the pickup truck bed; and slideably mounting a rigid panel along the driver side rail and the passenger side rail, wherein the rigid panel has a tapered construction which allows the rigid panel to fit between and adjacent the driver sidewall and the passenger sidewall of the pickup truck bed having a tapered bed construction.

A method of using a tonneau cover on a pickup truck having a tapered bed construction is provided by the present invention. The method including process steps of providing pickup truck comprising a cargo area surrounded by a driver sidewall, a passenger sidewall, a tailgate, and a front wall, wherein the cargo area is provided with a tapered bed construction; a driver side rail mounted on the driver sidewall; a passenger side rail mounted on the passenger sidewall; and a rigid panel slideably mounted along the driver side rail and the passenger side rail, and wherein the rigid panel has a tapered construction for allowing the rigid panel to fit between the driver sidewall and the passenger sidewall of the pickup truck bed; and sliding the rigid panel rearwardly. The method can additionally include a step of lifting a rearward edge of the rigid paned upwardly.

DETAILED DESCRIPTION OF THE INVENTION

The preferred embodiment of the invention is described in detail with reference to the drawings, where like reference numerals represent like parts and assemblies throughout the several views. Reference to the preferred embodiment does not limit the scope of the invention, which is limited only by the scope of the claims attached hereto. Furthermore, the following description often refers to or shows only one side of the tonneau cover of the invention. It should be appreciated that a similar or mirror construction can be provided on the opposed side of the tonneau cover. This is not to say that one half of the tonneau cover necessarily mirrors the other half, but rather that one will appreciate based upon the teachings of this application how the entire tonneau cover can be constructed and used.

Now referring to FIGS. 1–6, the reference numeral 10 generally designates an apparatus for covering or shielding the bed or box 12 of a pickup truck 14. The apparatus 10 will be referred to as a tonneau cover or a covering apparatus, and the interior area of the box 12 will be referred to as the cargo area. While the preferred embodiment of the invention is described in relation to the cargo area of the pickup truck, it should be appreciated that the invention can be adapted to cover other areas, such as, those provided in boats, trucks, and the like. In general, it will be apparent from the following description that the covering apparatus of the present invention can be adapted to cover areas which are bordered by opposing walls.

Figure 1:
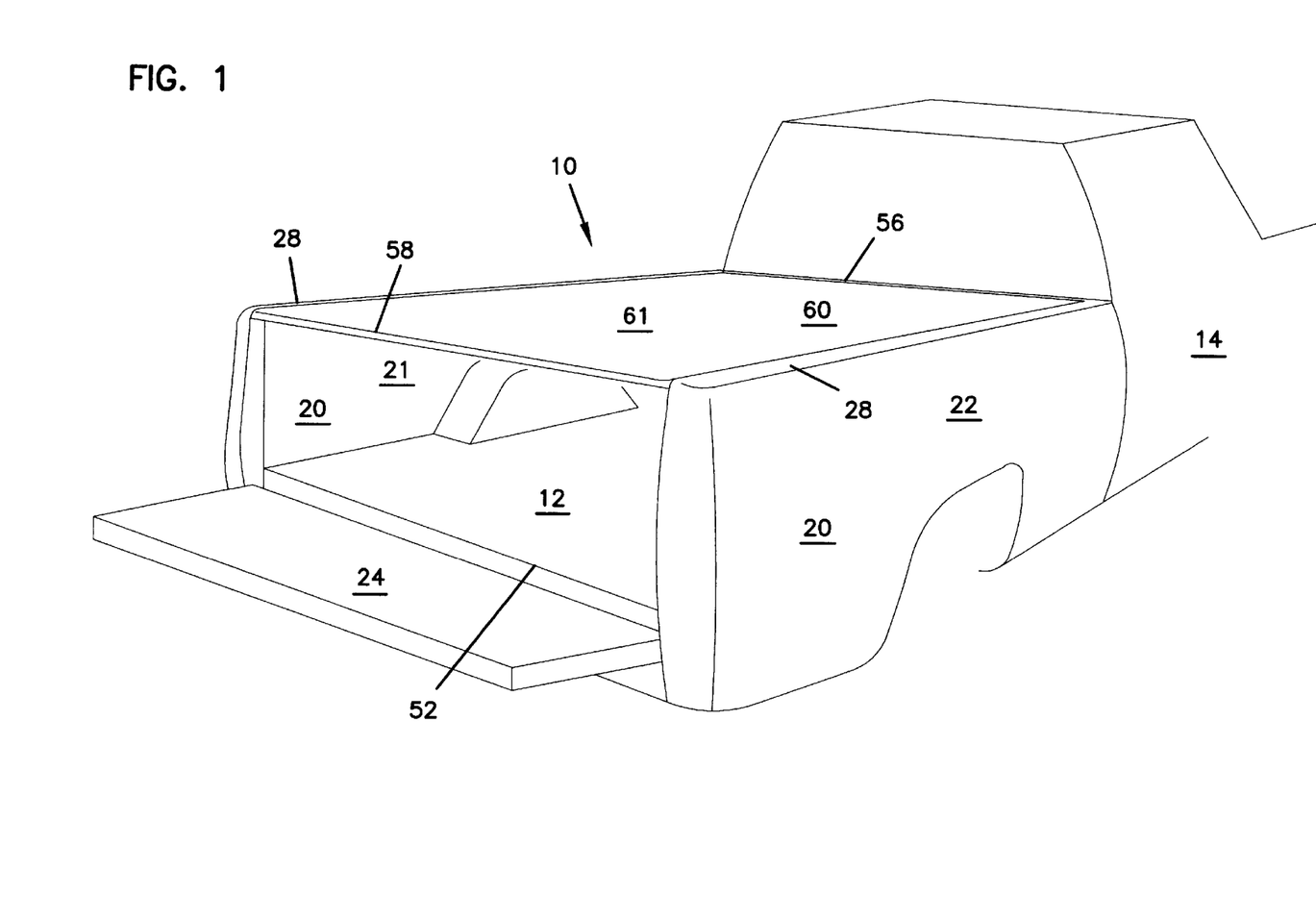
FIG. 1 is a perspective view of an embodiment of the tonneau cover according to the present invention provided in a closed position on a pickup truck bed having an open tailgate.
Figure 2:
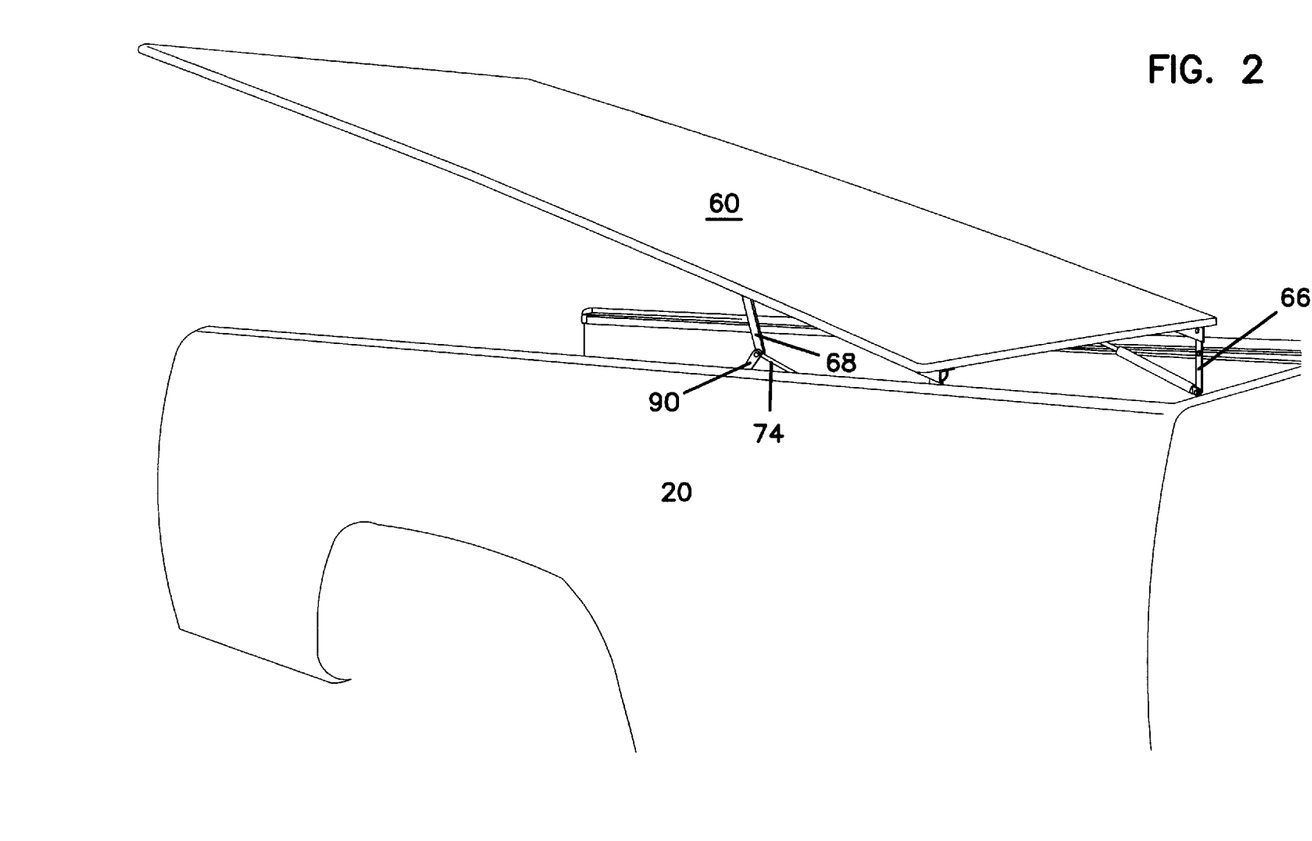
FIG. 2 is a perspective view of the top side of the tonneau cover of FIG. 1 shown in an open position.

The box 12 of the pickup truck 14 is similar to the boxes provided by many commercially available pickup trucks. In particular, the box 12 includes sidewalls 20, tailgate 24, and cab wall 26. The sidewalls 20 include a driver sidewall 21, and a passenger sidewall 22. As commonly found in many commercially available pickup trucks, the sidewalls 20 are provided with top surfaces 28 and downwardly depending walls 30 which includes an inside edge 54. In addition, the box 12 includes a forward end 50 and a rearward end 52.

The tonneau cover 10 includes a rigid panel 60. The rigidity of the panel should be sufficient so that the panel can support its own weight without significant sagging. This is in contrast to "soft" tonneau covers which are often provided with a fabric cover which are not self-supporting and often require additional supports to hold the cover in place. The rigid panel 60 includes a forward end 56 and a rearward end 58.

The box 12 is provided with a tapered bed construction. Many of the pickup trucks presently on the market are provided with a tapered bed construction. This means that the forward end 50 of the box 12 is wider than the rearward end 52. In most situations, the forward end 50 will have a width which is at least 0.5 inch wider than the rearward end 52. Generally, the difference in width between the forward end and the rearward end of a pickup truck bed is between about 0.5 and 2.5 inches but, of course, can be greater than 2.5 inches. In a common pickup truck having a tapered bed construction, the forward end will have a width of about 60 inches and the rearward end will have a width of about 57 inches. It should be understood that the width is measured as the distance between the inside edge or surface 54 of the sidewall 20. Furthermore, it should be understood that this same analysis could be applied instead to the inside surface 55 of the rail 80.

A tonneau cover which is designed to fit between sidewalls of a pickup truck bed having a tapered bed construction cannot slide rearwardly when it is provided in the same plane as the inside edge 54. In other words, once the panel 10 is set within the box 12 so that it is provided within and adjacent to the inside edge 54, it is not possible to slide the tonneau cover 10 rearwardly. This is because the width of the forward end 56 of the panel is wider than the rearward end 52 of the pickup truck bed 12. The forward end 56 of the panel is wide enough to fit within the forward end 50 of the bed 12, and the rearward end 58 of the panel is wide enough to fit within the rearward end 52 of the bed 12.

Applicants discovered that the panel 60 can slide rearwardly if it is lifted out of the plane of the inside edge 54. In other words, once the panel 60 is lifted above the sidewalls 20, the panel 60 is not prevented from sliding rearwardly by the dimensions of the pickup truck bed. Furthermore, the tonneau cover 10 can be locked in position when the panel 60 is provided between the sidewalls 20 and when the tailgate 24 is closed and locked. Additionally, tonneau cover 10 can include a separate locking mechanism.

Figure 3:
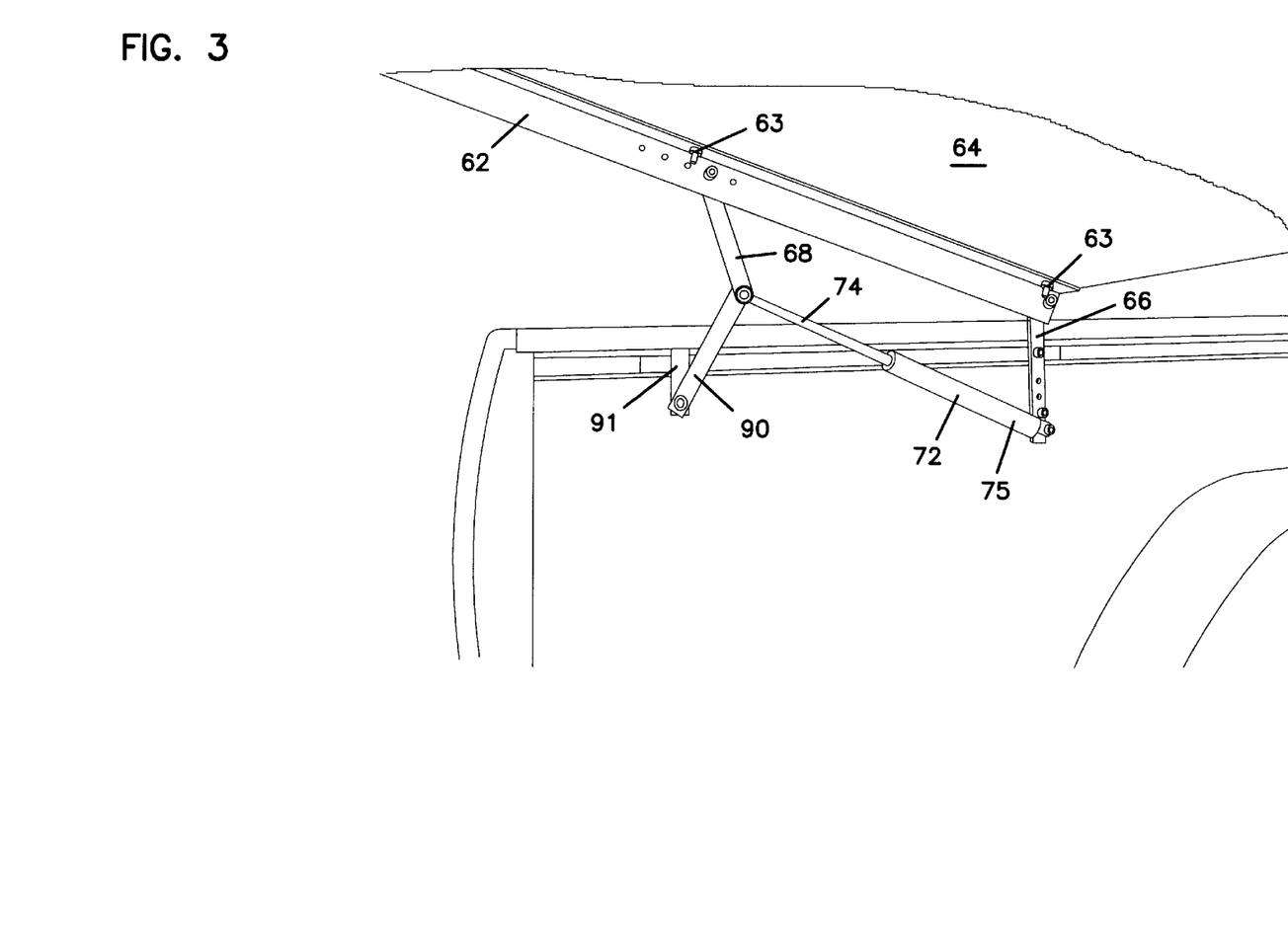
FIG. 3 is a perspective view of the underside of the tonneau cover of FIG. 1 shown in an open position.
Figure 4:
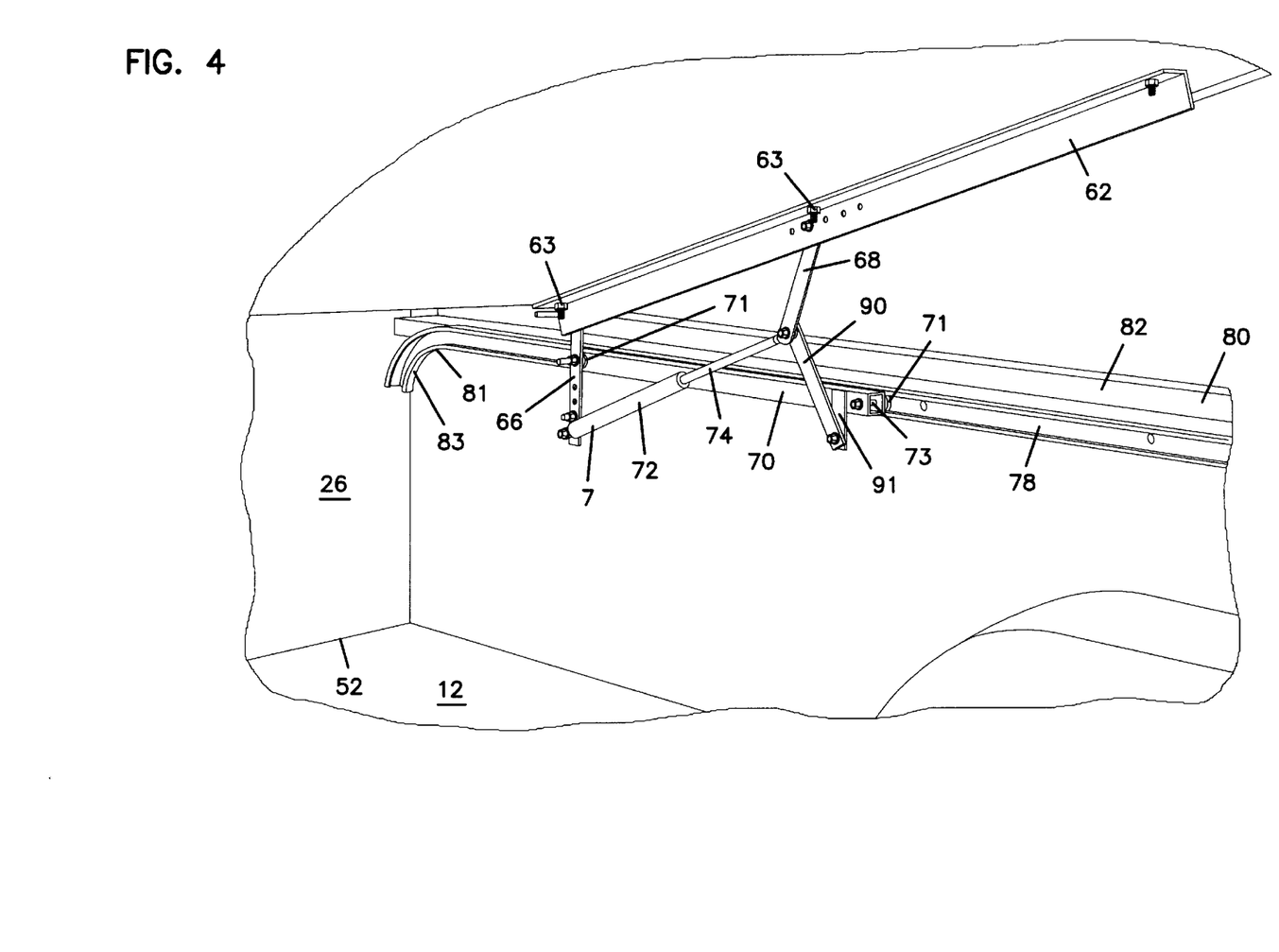
FIG. 4 is a perspective view of the underside of the tonneau cover of FIG. 1 shown in an open position.
Figure 5:
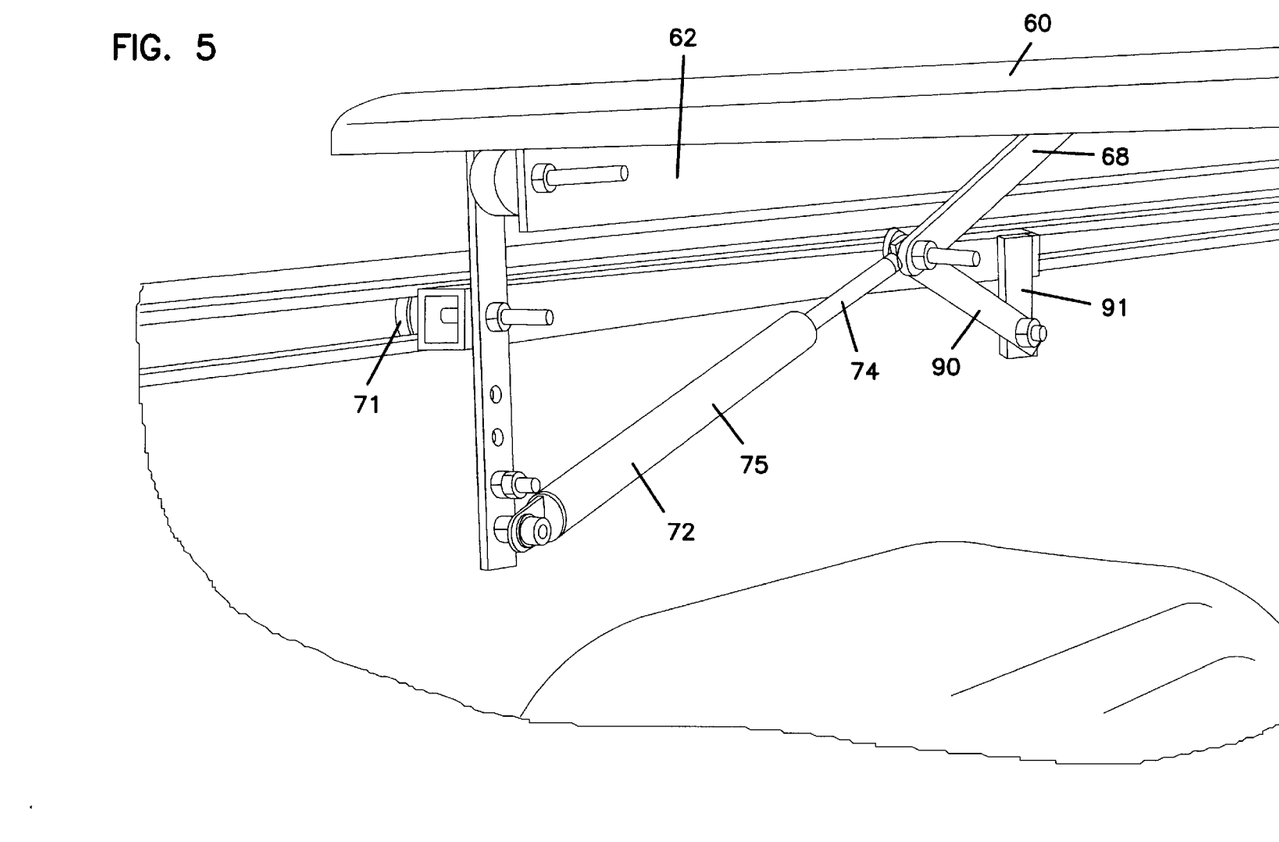
FIG. 5 is a perspective view of a portion of the tonneau cover of FIG. 1.
Figure 6:
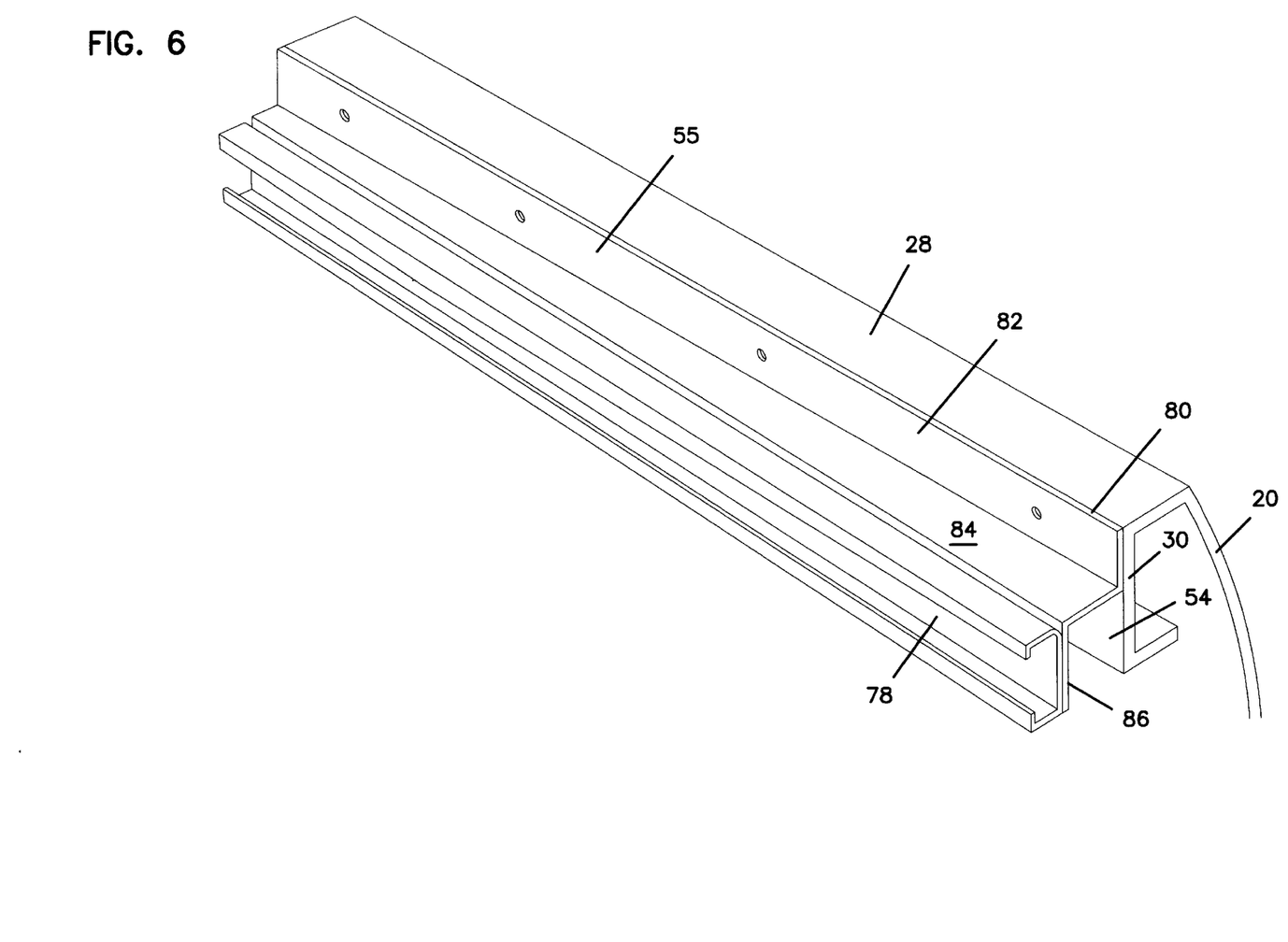
FIG. 6 is a perspective view of a portion of the tonneau cover of FIG. 1 showing a side rail.

A preferred embodiment for lifting the panel 60 out the pickup truck bed is shown in FIGS. 3–5. The tonneau cover 10 is provided with a rigid panel 60 having the dimensions which allow it to fit between the sidewalls 20 of a pickup truck having a tapered bed construction. Brackets 62 attach to the underneath side 64 of the rigid panel 60. The brackets 62 are firmly attached to the panel 60 by fasteners 63, and are rotatably connected to both the rearward stabilizing arm 66 and the upper extension arm 68. The rearward stabilizing arm 66 attaches to a sliding bracket 70 and a pneumatic cylinder 72. The upper extension arm 68 further attaches to a plunger 74 which moves in and out of the pneumatic cylinder housing 75. The upper extension arm 68 and the plunger 74 both engage the lower extension arm 90 which is connected via the rigid member 91 to the sliding bracket 70.

The sliding bracket 70 includes axles 73 which attach to rollers 71 which engage the track 78 and allow the sliding bracket 70 to move forwardly and rearwardly along the side rail 80. The side rail 80 is provided as a generally L-shaped rail. The side rail 80 includes a depending panel 82 which attaches to the sidewall 20 along depending wall 30. Fasteners such as screws can be provided to attach the depending panel to the sidewall 20. The depending panel 82 can have a depth which is roughly equivalent to the depth of the rigid panel 60. This allows the panel 60 to fit within the sidewalls 20 so that the top surface 61 of the panel 60 can be relatively flush with the top surface 28 of the sidewall 20. The side rail 80 additionally includes a wedge shaped panel 84 and another depending wall 86. The wedge shaped panel 84 accounts for the change in width across the pickup truck bed 12. The depending wall 86 includes a track 78 attached thereto along which the rollers 71 travel. The roller 71 is provided for movement along the track 78.

The axles 73 are not freely adjustable. In other words, they are fixed. The wedge shaped panel 84, therefore, is provided so that the panel 60 can slide without adjusting the axles 73. In other words, the tracks 78 provided on the driver sidewall and the passenger sidewall are parallel.

As shown in FIG. 4, the track 78 bends downward near its rearward end 81 toward the forward edge 52 of the pickup truck bed 12. Once the roller 71 begins rolling downward along the depending track 83 of the side rail 80, the panel 60 begins descending into a closed position covering the pickup truck bed 12. Once the panel 60 is provided in a closed position, the roller 71 can proceed no further along the depending track 83. In order to move the tonneau cover 10 into an open position, it is necessary to pull the tonneau cover rearwardly which causes the roller 71 to ascend the depending track 83. This in turn causes the panel 60 to lift above the plane of the pickup truck bed.

In addition to providing a sliding tonneau cover, the present invention allows for opening the tonneau cover by elevating the rearward end 58. As shown in FIG. 3, a pneumatic cylinder 72 includes a cylinder 75 and a plunger 74. The cylinder 75 receives the plunger 74. The cylinder 75 pivotably attaches to the arm 66. The plunger 74 attaches to the upper extension arm 68 and the lower extension arm 90. The combination of the plunger 74, the upper extension arm 68, and the lower extension arm 90 can be referred to as an adjustable Y connection. As the rearward end 58 is elevated, the plunger 74 extends out of the cylinder 75 causing the adjustable Y connection to flatten, causing the upper arm 68 and lower arm 90 to separate.

This, in turn, extends the rearward end 58 of the panel 60 upwardly relative to the forward end 56. Furthermore, it should be appreciated that the pneumatic cylinder 72 is provided with a sufficient size to hold the panel 60 in position when the rearward end 58 is elevated. Furthermore, the rearward end 58 should remain in position even as the panel 60 slides forwardly or rearwardly along the track 78.

Figure 7:
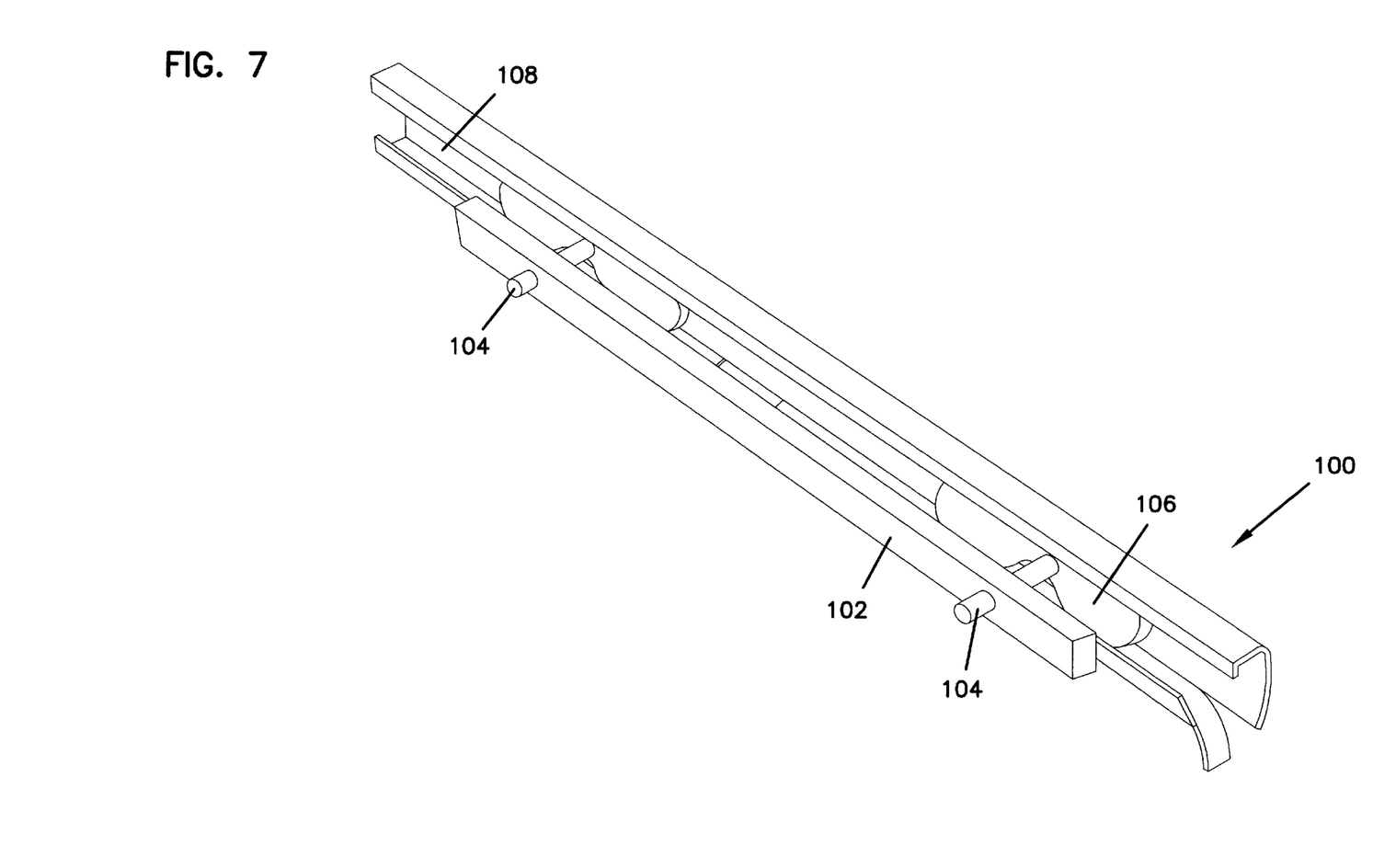
FIG. 7 is an alternative embodiment of a side rail system for the tonneau cover according to the present invention.
Figure 8:
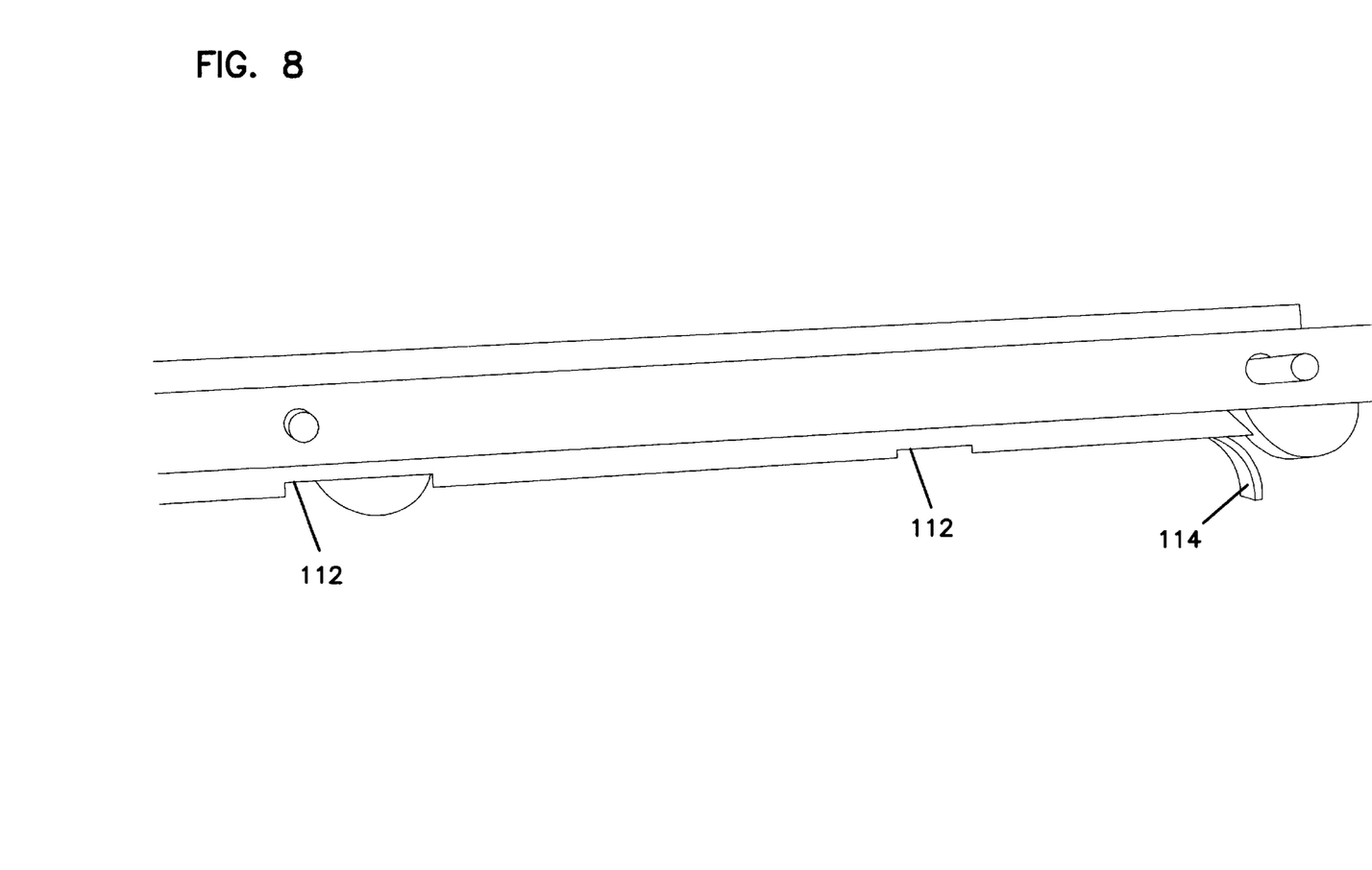
FIG. 8 is a side view of the alternative side rail system shown in FIG. 7.
Figure 9:
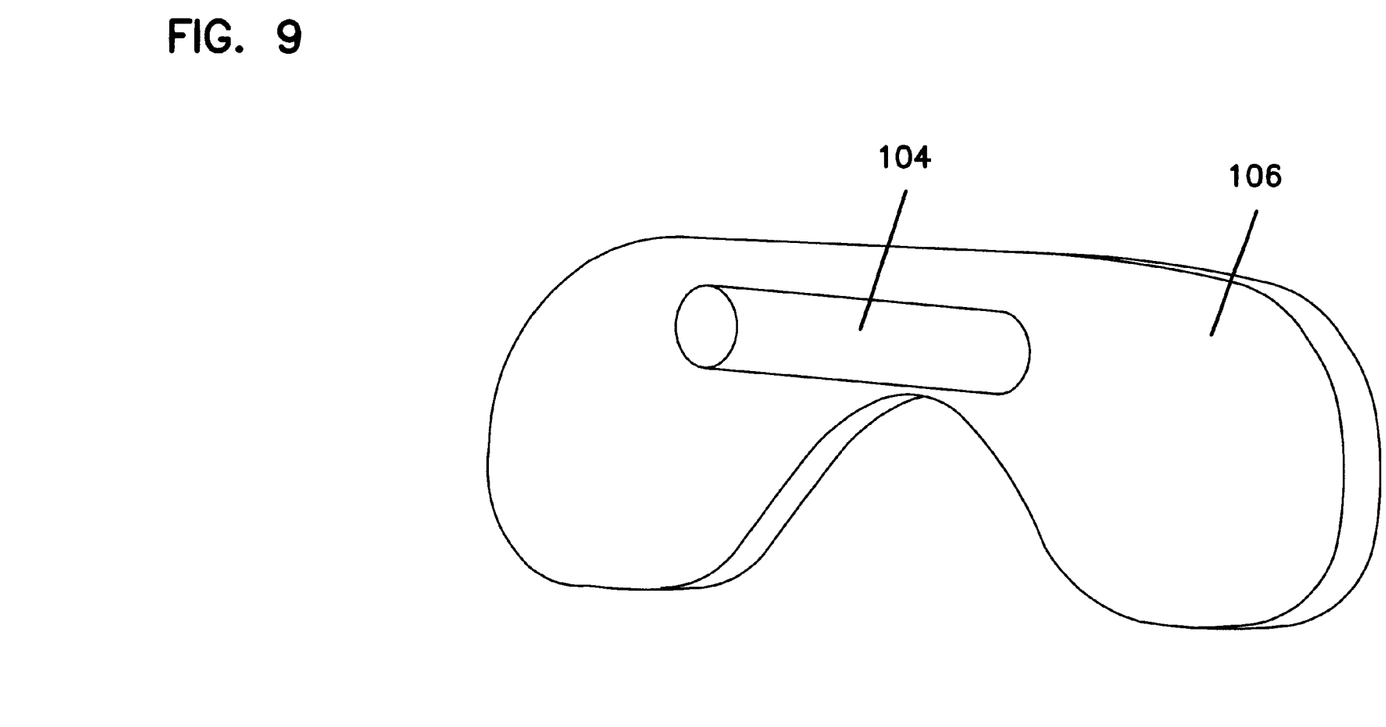
FIG. 9 is a perspective view of the slide component of the alternative side rail system of FIG. 7.

Now referring to FIGS. 7–9, an alternative embodiment of the tonneau cover is described with reference to the side rail system 100. The rail system 100 is different from the previously described rail system because it provides for movement of the bracket 102 along the length of axles 104 as the tonneau cover panel (not shown) slides rearwardly or forwardly. Thus, the bracket 102 would be mounted on the underneath side of the tonneau cover panel. Furthermore, the bracket 102 is slideably attached to the axles 104. The axles 104 are shown attached to cars or slides 106 which are then placed within the track 108. Alternatively, the slides or cars 106 could be replaced with rollers. However, it is expected that the slides 106 could be made from a plastic, slippery material would function advantageously in the invention.

The track 108 can be attached to the sidewalls of the pickup truck bed similar to the way the track described above is attached. As shown, the track 108 with bracket 102 slideably attached to the axles 104 would be useful when the tracks are not parallel. In other words, there would not be any need to provide the wedge shaped panel. It is not necessary for the rail to have a variable width to reflect the tapered bed construction of the pickup truck. As discussed above, it is the movement of the bracket 102 along the axles 104 which accounts for the varying width of the pickup truck bed.

The track 108 can be provided with slots or openings 112 which allow the slides 106 to descend. This allows the rigid cover to seat between the sidewalls of the pickup truck bed. Thus, when the panel is pulled rearwardly, the slides 106 ascend back into the track 108, which causes the panel to elevate above the sidewall plane. A lip 114 can be provided to assist in elevating the slides 106.

It should be appreciated that the tonneau cover of the present invention can be advantageously used without having to lift the rearward end of the tonneau cover upwardly. One can simply pull the tonneau cover rearwardly in order to open the area of the pickup truck bed immediately behind the cab, and access that portion of the pickup truck cargo area. This general type of operation of the tonneau cover could be compared to that of a drawer. It is generally convenient to lower the tailgate to access the rearward portion of the pickup truck cargo area. However, most tonneau covers do not provide easy access to the forward portion of the cargo area.

It should be appreciated that the tonneau cover described by the present invention can be additionally applied in situations where it is desired to provide the rigid panel over the sidewalls, rather than flush with the top surface of the sidewalls as described above. In such a situation, it would not be necessary to have the panel elevate prior to sliding back rearwardly.

It should be understood that the panel can be manufactured from any material that allows it to provide a rigid structure. In preferred embodiments, it is believed that the rigid panel will be manufactured from a material, such as, fiberglass, hand chopped fiberglass with ribbing, aluminum sheet with a honeycomb core for lightness, or a flat plastic sheet with a foam core. Furthermore, it may be desirable to manufacture the panel and bracket so they are integral, or made of a single construction rather than attached.

While the panel 60 described above is shown to be a single construction, it should be understood that it can be provided as two or more separate constructions. In addition, the panel need not cover the entire cargo area.

What is claimed is:

1. A tonneau cover for a pickup truck comprising:
   (a) a driver side rail for mounting to a driver sidewall of a pickup truck bed;
   (b) a passenger side rail for mounting to a passenger sidewall of a pickup truck bed;
   (c) a panel having a construction which allows said panel to fit between and adjacent a driver sidewall and a passenger sidewall of a pickup truck that, said panel having a passenger side, a driver side, a forward end, and a rearward end;
   (d) a passenger side bracket attached to the passenger side of said panel and slidably mounted to said passenger side rail to allow said panel to slide forwardly and rearwardly along said passenger side rail;
   (e) a driver side bracket attached to the driver side of said panel and slidably mounted to the driver side rail to allow said panel to slide forwardly and rearwardly along said driver side rail; and
   (f) wherein said passenger side bracket and said driver side bracket allow the rearward end of said panel to lift away from said driver side rail and said passenger side rail.

2. A tonneau cover according to claim 1, wherein the tonneau cover can be locked in a closed position by locking a truck tailgate.

3. A tonneau cover according to claim 1, wherein the driver side rail and the passenger side rail are constructed and arranged to curve downward proximate the forward end of a pickup truck bed to provide seating of the panel between the driver sidewall and a passenger sidewall of a pickup truck bed having a tapered bed construction.

4. A tonneau cover according to claim 1, wherein the panel includes a forward end and a rearward end, the rearward end being rotateable upward in relation to the forward end to expose an area of a pickup truck bed.

5. A tonneau cover according to claim 1, wherein the driver side rail and the passenger side rail further comprise a wedge shaped panel and track.

6. A tonneau cover for a pickup truck according to claim 1, wherein the panel is provided with a tapered construction which allows it to fit between the driver sidewall and the passenger sidewall of a pickup truck bed having a tapered construction.

7. A tonneau cover for a pickup truck according to claim 1, further comprising pneumatic cylinder for holding the panel in position when a rearward end of the panel is elevated.

8. A tonneau cover for a pickup truck comprising:
   (a) a driver side rail for mounting to a driver sidewall of a pickup truck bed, wherein the driver side rail comprises a wedge shaped panel and track;
   (b) a passenger side rail for mounting to a passenger sidewall of a pickup truck bed, wherein the passenger side rail comprises a wedge shaped panel and track;
   (c) a panel slidably mounted to the driver side rail and the passenger side rail, and having a construction which allows the panel to fit between and adjacent a driver sidewall and a passenger sidewall of a pickup truck bed.

9. A tonneau cover for a pickup truck according to claim 8, wherein the panel is provided with a tapered construction which allows it to fit between the driver sidewall and the passenger sidewall of a pickup truck bed having a tapered construction.

10. A tonneau cover according to claim 8, further comprising pneumatic cylinder for holding the panel in position when a rearward end of the panel is elevated.

11. A tonneau cover according to claim 8, wherein the tonneau cover can be locked in position by locking a truck tailgate.

12. A tonneau cover according to claim 8, wherein the driver side rail and the passenger side rail are constructed and arranged to curve downward proximate the forward end of a pickup truck bed to provide seating of the panel between the driver sidewall and the passenger sidewall of a pickup truck bed.

13. A tonneau cover according to claim 8, wherein the panel includes a forward end and a rearward end, the rearward end being rotatable upward in relation to the forward end to expose an area of a pickup truck bed.

14. A pickup truck according to claim 1, wherein the panel includes a forward end and a rearward end, the rearward end being rotatable upward in relation to the forward end to expose the cargo area.

15. A pickup truck according to claim 1, wherein the pickup truck bed has a tapered construction.

16. A pickup truck according to claim 15, wherein the panel is provided with a tapered construction which allows it to fit between the driver sidewall and the passenger sidewall of the pickup truck.

17. A pickup truck according to claim 22, wherein the tonneau cover can be locked in a closed position by locking the tailgate.

18. A pickup truck according to claim 1, wherein the panel includes a forward end and a rearward end, the rearward end being rotatable upward in relation to the forward end to expose the cargo area.

19. A method of installing a tonneau cover on a pickup truck, said method comprising steps of:
    (a) mounting a driver side rail on a driver sidewall of the pickup truck bed;
    (b) mounting a passenger side rail on a passenger sidewall of the pickup truck bed;
    (c) providing a panel having a driver side end, a passenger side end, a forward end, and a rearward end;
    (d) attaching a driver side bracket to the driver side of said panel and slidably mounting the driver side bracket to the driver side rail to allow said panel to slide forwardly and rearwardly along said driver side rail;
    (e) attaching a passenger side bracket attached to the passenger side of said panel and slidably mounting the passenger side bracket to the passenger side rail to allow said panel to slide forwardly and rearwardly along said passenger side rail;
    (g) wherein said passenger side bracket and said driver side bracket allow the rearward end of said panel to lift away from said driver side rail and said passenger side rail.

20. A method according to claim 19, wherein the panel includes a forward end and a rearward end, the rearward end being rotatable upward in relation to the forward end to expose an area of the pickup truck bed.

21. A tonneau cover according to claim 1, wherein said driver side rail further comprises a driver side track and said driver side bracket further comprises rollers which engage said driver side track, and said passenger side rail further comprises a passenger side track and said passenger side bracket further comprises rollers which engage said passenger side track.

22. A tonneau cover according to claim 1, wherein said driver side rail further comprises a driver side track and said driver side bracket further comprises a slide which engages said driver side track, and said passenger side rail further comprises a passenger side track and said passenger side bracket further comprises a slide which engages said passenger side track.

23. A pickup truck comprising:
    (a) a cargo area surrounded by a driver sidewall, a passenger sidewall, a tailgate, and a front wall;
    (b) a driver side rail mounted on the driver sidewall;
    (c) a passenger side rail mounted on the passenger sidewall;
    (d) a panel having a driver side end, a passenger side end, a forward end, and a rearward end;
    (e) a driver side bracket attached to the driver side of said panel and slidably mounted to the driver side rail to allow said panel to slide forwardly and rearwardly along said driver side rail;
    (f) a passenger side bracket attached to the passenger side of said panel and slidably mounted to the passenger side rail to allow said panel to slide forwardly and rearwardly along said passenger side rail;
    (g) wherein said passenger side bracket and said driver side bracket allow the rearward end of said panel to lift away from said driver side rail and said passenger side rail.

24. A method of using a tonneau cover on a pickup truck, said method including process steps of:
    (a) providing a pickup truck comprising a cargo area surrounded by a driver sidewall, a passenger sidewall, a tailgate and a front wall; a driver side rail mounted on the driver sidewall; a passenger side rail mounted on the passenger sidewall; a panel provided between the driver side rail and the passenger side rail, said panel having a driver side, a passenger side, a forward end, and a rearward end; and a driver side bracket attached to the driver side of said panel and slidably mounted to the driver side rail to allow said panel to slide forwardly and rearwardly along said driver side rail; a passenger side bracket attached to the passenger side of said panel and slidably mounted to the passenger side rail to allow said panel to slide forwardly and rearwardly along said passenger side rail; wherein said passenger side bracket and said driver side bracket allow the rearward end of said panel to lift away from said driver side rail and said passenger side rail; and
    (b) moving the panel to expose the cargo area by a step of:
        (i) sliding the panel rearwardly;
        (ii) lifting the rearward end of the panel upwardly; and
        (iii) combination of steps (i) and (ii).

* * * * *